United States Patent
Zhang et al.

(10) Patent No.: US 7,330,524 B2
(45) Date of Patent: Feb. 12, 2008

(54) JOINT SYNCHRONIZATION AND IMPAIRMENTS ESTIMATION USING KNOWN DATA PATTERNS

(75) Inventors: Ning Zhang, Milpitas, CA (US); Athanasios A. Kasapi, San Francisco, CA (US); William J. McFarland, Los Altos, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 570 days.

(21) Appl. No.: 11/027,280

(22) Filed: Dec. 30, 2004

(65) Prior Publication Data

US 2006/0146969 A1 Jul. 6, 2006

(51) Int. Cl.
*H04L 7/04* (2006.01)
(52) U.S. Cl. ............... 375/362; 375/365; 375/366; 375/371; 370/509; 370/514
(58) Field of Classification Search ............ 375/354, 375/362, 365, 366, 371; 370/503, 509, 511, 370/513, 514, 516
See application file for complete search history.

(56) References Cited

U.S. PATENT DOCUMENTS

| | | | |
|---|---|---|---|
| 5,706,284 A * | 1/1998 | Lee | 370/324 |
| 6,768,747 B1 * | 7/2004 | Dogan | 370/509 |
| 2004/0028160 A1 * | 2/2004 | Sienek et al. | |
| 2004/0190560 A1 * | 9/2004 | Maltsev et al. | |

\* cited by examiner

*Primary Examiner*—Dac V. Ha
(74) *Attorney, Agent, or Firm*—Bever, Hoffman & Harms, LLP; Jeanette S. Harms

(57) ABSTRACT

Synchronization and impairment estimations can be performed jointly, thereby saving valuable time for decoding of the received packet. An initial synchronization in a TDMA system can be performed. Using this synchronization, the frequency offset choices and timing offset choices can be advantageously bounded within predetermined ranges. At this point, an algorithm can find the minimum error that gives the best frequency offset choice and timing offset choice combination over their respective ranges, together with the estimates of the signal magnitude and phase and at least one of a DC offset magnitude and phase, and a spur magnitude and phase.

11 Claims, 2 Drawing Sheets

Packet 100

| Preamble 101 | Unique Word 102 | Payload 103 | CRC 104 |

JOINT SYNCHRONIZATION AND IMPAIRMENTS ESTIMATION USING KNOWN DATA PATTERNS

BACKGROUND OF THE INVENTION

1. Field of the Invention

The present invention relates to wireless communication and in particular to the joint synchronization and impairment estimation using a known data pattern sent in a packet.

2. Description of the Related Art

In a wireless communication system, a receiver needs to achieve carrier and timing synchronization to ensure correct decoding of a packet. Additionally, the receiver must estimate and correct various analog circuit impairments, such as DC offset and spurious or interfering signals (i.e. spurs). A plethora of algorithms can be used to provide synchronization or impairment estimates individually. For example, the IEEE 802.11a standard (1999) in Section 17.3.2.1(a) describes the PLCP preamble and the function of short and long training symbols in performing coarse and fine frequency estimation. Various articles, such as "n/4-shift QPSK Coherent Detection Demodulator for TDMA/TDD systems", written by Y. Matsumoto et al., published by IEEE in 1993 and "A Low Power Demodulator LSIC for Personal Communications High Performance Coherent Detection Demodulator", written by Y. Matsumoto et al., published by PIMRC in 1994, describe methods directed to PHS synchronization. In general, for impairment estimates, the DC offset can be estimated by averaging (e.g. using a low pass filter)(see U.S. Pat. No. 6,785,523, for example) and spurs can be estimated by converting to DC and then averaging (e.g. using a bandpass filter at spur frequency). Unfortunately, computing these algorithms takes valuable time that could be used in other important receiver functions, e.g. the actual decoding of the packet payload.

Therefore, a need arises for a technique that accelerates providing synchronization and impairment estimates.

SUMMARY OF THE INVENTION

Synchronization and impairment estimations can be performed jointly, thereby saving valuable time for decoding of the received packet. An initial synchronization in a TDMA system (e.g. a personal handy phone system (PHS)), can be performed. Using this initial synchronization, the frequency offset choices and timing offset choices can be advantageously bounded within constrained ranges. Using a known data pattern included in the packet and a known receiver spur frequency, an algorithm can then advantageously find a minimum of an error measure that can give the best frequency offset choice and timing offset choice combination over their respective constrained ranges, together with the estimates of the signal magnitude and phase, the DC offset magnitude and phase, and the spur magnitude and phase.

Determining a minimum of an error measurement can include using a least mean square (LMS) algorithm including the signal magnitude and phase, the DC offset magnitude and phase, and the spur magnitude and phase. This LMS algorithm can be represented by the equation:

$$\begin{pmatrix} \hat{A} \\ \hat{B} \\ \hat{C} \end{pmatrix} = (M^T M)^{-1} M^T \vec{y},$$

wherein the minimum error can be represented by the equation:

$$error_{\text{tim\_offset,freq\_offset}} = \left| \frac{\vec{y}_{\text{tim\_offset}} - }{(\hat{A}\vec{x}e^{jw_{\text{freq\_offset}}t} + \hat{B} + \hat{C}e^{jw_{spur}t})} \right|^2.$$

DETAILED DESCRIPTION OF THE FIGURES

Figures 1, 2:
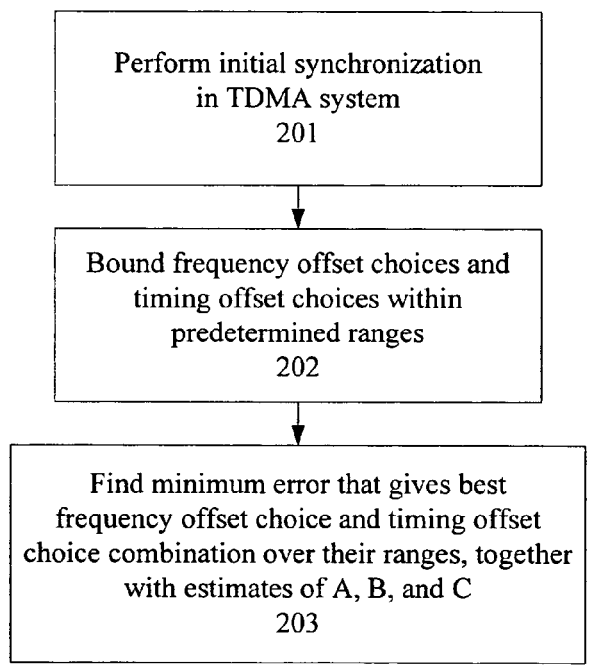
FIG. 1 illustrates a simplified packet including a preamble, a unique word, a payload, and a cyclic redundancy check value. The unique word is a known data pattern that can identify the transmitting entity as a handset or a cell station.
FIG. 2 illustrates a technique for jointly providing synchronization and impairment estimations.

In accordance with one aspect of the invention, the receiver can use a short known data pattern to jointly provide synchronization and impairment estimations. This short known data pattern is called a "unique word". Notably, cell stations in a wireless communication system may have a distinct unique word for transmission. Similarly, handsets in a wireless communication system have a unique word incorporated in transmissions, which may be different from the unique word for the cell stations. FIG. 1 illustrates a simplified packet 100 including a preamble 101, a unique word 102, a payload 103, and a cyclic redundancy check (CRC) value 104.

In one embodiment, unique word 102 has only 8 symbols (i.e. 16 bits). According to the PHS standard, the receiver should decode unique word 102 to determine whether bit errors are present. If no bit errors are present, then reception is good and payload 103 can be accurately decoded. Note that unique word 102 effectively provides a redundant function to CRC value 104, but before the decoding of payload 103 is complete. In accordance with one aspect of the invention, the unique word can be advantageously used for two purposes: (1) to determine the presence of bit errors and (2) to jointly provide synchronization as well as impairment estimations (such as DC offset or spurs).

If DC offset and/or a spur is present, a particular time-interval of the received signal waveform, $\bar{y}$, can be expressed as:

$$\vec{y} = A\vec{x}e^{jw_{offset}t} + B + Ce^{jw_{spur}t} \quad \text{(Equation 1)}$$

where the vector x is the waveform of the unique word, A is a complex-valued quantity representing the signal magnitude and phase, B is a complex-valued quantity representing the DC offset magnitude and phase, C is a complex-valued quantity representing the spur magnitude and phase, $w_{offset}$ is the frequency offset between transmitter and receiver, and $w_{spur}$ is the receiver spur frequency. Of these variables, only the unique word $\bar{x}$ and receiver spur frequency $w_{spur}$ are known. Thus, the signal magnitude and phase A, the DC offset magnitude and phase B, the spur magnitude and phase C, and the frequency offset $w_{offset}$ (i.e. 4 of the 6 variables) are unknown.

Note that another unknown variable, i.e. the time offset, is also implicitly present. Specifically, y is an over-sampled signal, wherein the timing offset of the starting sample corresponding to the unique word waveform is initially unknown. However, in a TDMA system, each packet arrives in a specific interval and therefore it is sufficient to estimate timing within some constrained range, for example, +/−1 symbol. In one embodiment, each symbol can have 8 over-sampled sample times, thereby yielding 17 different choices for the initial sample of the received waveform to correspond to the initial sample of the unique word. Thus, in accordance with one aspect of the invention, the time offset values can be advantageously bounded (also referred to as, "constrained") using this predetermined range during an initial synchronization.

In accordance with another aspect of the invention, the frequency offset $w_{offset}$ can be estimated using a temperature compensated crystal oscillator (TCXO), which is very accurate. In another embodiment, the frequency offset $w_{offset}$ can be estimated using a method described in U.S. patent application Ser. No. 11/027,279, entitled "Frequency Offset Correction Techniques For Crystals Used In Communication Systems", filed on Dec. 30, 2004, and incorporated by reference herein. As described therein, both an open-loop, temperature-based and a closed-loop frequency estimate based technique can be advantageously used for pulling the frequency of a non-TCXO. Using these techniques, the frequency offset $w_{offset}$ can be quickly bounded to ±2 ppm. In this case, with a unit measure of 0.25 ppm, 9 frequency offsets can be possible. Thus, the frequency offset values can also be advantageously bounded using this predetermined range during an initial synchronization.

In some embodiments, $w_{offset}$ or time offset values may be known sufficiently accurately that the constrained range of values may in fact be a single value.

Notably, after limiting the values for the timing and frequency offset variables, then for each possible timing-offset and frequency-offset pair, only three unknown variables remain, i.e. A, B, and C.

Note that for $$M = \begin{pmatrix} x_1 & 1 & 1 \\ x_2 e^{jw_{offset}T} & 1 & e^{jw_{spur}T} \\ \vdots & \vdots & \vdots \\ x_n e^{jw_{offset}(n-1)T} & 1 & e^{jw_{spur}(n-1)T} \end{pmatrix}, \quad \text{Equation 1}$$

can be rewritten as:

$$\vec{y} = M \begin{pmatrix} A \\ B \\ C \end{pmatrix} \quad \text{(Equation 2)}$$

For a given frequency offset freq_offset and timing offset tim_offset, the unknowns (A, B, and C) can be solved by the following LMS algorithm:

$$\begin{pmatrix} \hat{A} \\ \hat{B} \\ \hat{C} \end{pmatrix} = (M^T M)^{-1} M^T \vec{y}, \quad \text{(Equation 3)}$$

wherein the residual error can be expressed by:

$$error_{tim\_offset, freq\_offset} = \left| \vec{y}_{tim\_offset} - \begin{pmatrix} \hat{A}\vec{x}e^{jw_{freq\_offset}t} + \\ \hat{B} + \hat{C}e^{jw_{spur}t} \end{pmatrix} \right|^2. \quad \text{(Equation 4)}$$

In this equation, $\vec{y}_{tim\_offset}$ represents the received signal starting at some particular time sample within the constrained range.

In some embodiments, the contribution of a spur or of a DC value may be known to be insignificant, allowing the elimation of $\hat{B}$ or $\hat{C}$ in Equation 3, with a related simplification of the M matrix. For example, if spurs were known to be insignificant, the $\hat{C}$ term and the $e^{jw_{spur}T}$ entries of the M matrix may be eliminated.

Of importance, since the $$\vec{x}e^{jw_{freq\_offset}t}$$

and $e^{jw_{spur}t}$ terms are known, discrete and bounded, the $(M^T M)^{-1} M^T$ matrix may be advantageously pre-computed.

FIG. 2 illustrates a technique 200 that can be advantageously used for jointly providing synchronization and impairment estimations. In this technique, step 201 can include performing an initial synchronization in a TDMA system (i.e. a time division multiple access system in which several devices can share the same frequency band at the same time by letting each device take "turns" sending digital data, wherein each turn is called a time slot).

In one embodiment, this initial synchronization can be performed using a received packet (e.g. a CCH, TCH, or sync burst transmission) from the controlling device (e.g. a cell station or a base station). CCH packets are long-preamble entities sent on the control channel (a predetermined frequency to which PHS phones listen for connection status and control data). TCH packets (TDMA data packets on a transmission channel) have relatively short preamble data and sync blocks (which provide approximately the same preamble characteristics as CCH packets, but no control data) that occur from time to time on the transmission channel.

Figure 3:
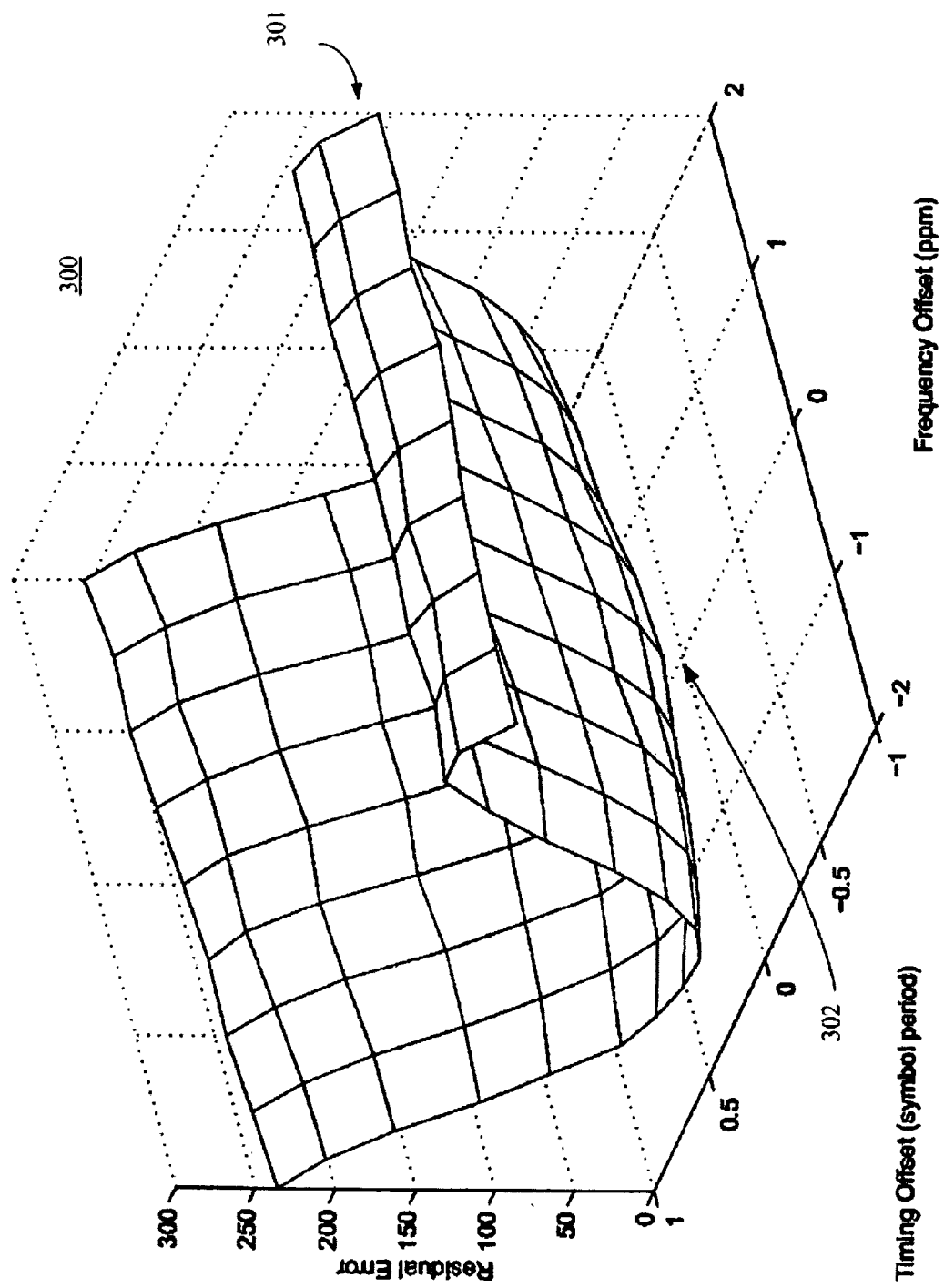
FIG. 3 illustrates an exemplary grid of a discrete-point space including an error surface.

Based on this initial synchronization, a predetermined number of frequency offset choices and timing offset choices can be advantageously bounded within predetermined ranges in step 202. Once these predetermined frequency and timing offset choices are provided and given a known data pattern included in a packet and a known receiver spur frequency, step 203 can find a minimum of $error_{tim\_offset, freq\_offset}$ that gives the best frequency offset choice and timing offset choice combination over their respective ranges, together with the estimates of the signal magnitude and phase A, the DC offset magnitude and phase B, and the spur magnitude and phase C. FIG. 3 illustrates an exemplary grid of a discrete-point space 300 including an error surface 301. In error surface 301, an arrow 302 indicates the minimum error.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, in one embodiment, buffering of the signal can be done, thereby allowing the receiver to "catch up" after providing the synchronization and impairment estimations. In another embodiment, a software program can jointly provide synchronization and impairment estimations in a wireless communication system. Accordingly, it is intended that the scope of the invention be defined by the following Claims and their equivalents.

The invention claimed is:

1. A method of providing synchronization and impairment estimations in a wireless communication system, the method comprising:
    performing an initial synchronization;
    bounding a frequency offset within a first range based on the initial synchronization and providing a first discrete number of frequency offset choices within the first predetermined range;
    bounding a timing offset within a second range based on the initial synchronization and providing a second discrete number of timing offset choices within the second range; and
    using a known data pattern included in a packet and a known receiver spur frequency, determining a frequency offset choice and timing offset choice combination over the first range and the second range that gives a minimum of an error measurement, producing thereby estimates of a signal magnitude and phase and at least one of a DC offset magnitude and phase, and a spur magnitude and phase.

2. The method of claim 1, wherein determining the minimum of the error measurement includes using a least mean square (LMS) algorithm including the signal magnitude and phase, the DC offset magnitude and phase, and the spur magnitude and phase.

3. The method of claim 2, wherein the LMS algorithm is represented by the equation:

$$\begin{pmatrix} \hat{A} \\ \hat{B} \\ \hat{C} \end{pmatrix} = (M^T M)^{-1} M^T \vec{y}.$$

4. The method of claim 3, wherein the minimum of the error measurement is represented by the equation:

$$error_{\text{tim\_offset,freq\_offset}} = \left| \frac{\vec{y}_{\text{tim\_offset}} -}{\left( \hat{A} \vec{x} e^{jw_{\text{freq\_offset}} t} + \hat{B} + \hat{C} e^{jw_{spur} t} \right)} \right|^2.$$

5. The method of claim 3, wherein the matrix $(M^T M)^{-1} M^T$ has been pre-computed.

6. The method of claim 3, wherein the sampled received waveform $\vec{y}$ is saved in memory before processing begins.

7. A software program for jointly providing synchronization and impairment estimations in a wireless communication system, the software program comprising:
    code for bounding a frequency offset within a first range based on an initial synchronization and providing a first discrete number of frequency offset choices within the first range;
    code for bounding a timing offset within a second range based on the initial synchronization and providing a second discrete number of timing offset choices within the second range;
    code for using a known data pattern included in a packet and a known receiver spur frequency; and
    code for determining a minimum of an error measurement that gives a best frequency offset choice and timing offset choice combination over the first and second predetermined ranges, together with estimates of a signal magnitude and phase and at least one of a DC offset magnitude and phase, and a spur magnitude and phase.

8. The software program of claim 7, wherein the code for determining the minimum of the error measurement includes code for using a least mean square (LMS) algorithm including the signal magnitude and phase and at least one of a DC offset magnitude and phase, and a spur magnitude and phase.

9. The software program of claim 8, wherein the LMS algorithm is represented by the equation:

$$\begin{pmatrix} \hat{A} \\ \hat{B} \\ \hat{C} \end{pmatrix} = (M^T M)^{-1} M^T \vec{y}.$$

10. The software program of claim 9, wherein the minimum of the error measurement is represented by the equation:

$$error_{\text{tim\_offset,freq\_offset}} = \left| \frac{\vec{y}_{\text{tim\_offset}} -}{\left( \hat{A} \vec{x} e^{jw_{\text{freq\_offset}} t} + \hat{B} + \hat{C} e^{jw_{spur} t} \right)} \right|^2.$$

11. A method of providing synchronization and impairment estimations in a wireless communication system, the method comprising:
    performing an initial synchronization;
    bounding a frequency offset within a first range based on the initial synchronization;
    bounding a timing offset within a second range based on the initial synchronization; and
    using a known data pattern included in a packet and a known receiver spur frequency, determining a frequency offset choice and timing offset choice combination over the first range and the second range that gives a minimum of an error measurement, thereby producing estimates of a signal magnitude and phase and at least one of a DC offset magnitude and phase, and a spur magnitude and phase.

* * * * *